(12) United States Patent
Zhang et al.

(10) Patent No.: US 8,975,781 B2
(45) Date of Patent: Mar. 10, 2015

(54) METHOD AND SYSTEM FOR SUPPLYING EMERGENCY POWER TO NUCLEAR POWER PLANT

(75) Inventors: Shanming Zhang, Shenzhen (CN); Changshen Lu, Shenzhen (CN); Zhonghua Dai, Shenzhen (CN); Junqi Chen, Shenzhen (CN); Chengming Wang, Shenzhen (CN); Yongnian Wang, Shenzhen (CN); Gang Zhu, Shenzhen (CN); Shuzhou Li, Shenzhen (CN); Jiedong Lin, Shenzhen (CN); Yukun Wu, Shenzhen (CN); Guangchao Su, Shenzhen (CN); Zongchuan Mei, Shenzhen (CN); Xuehua Han, Shenzhen (CN); Qiquan Zeng, Shenzhen (CN); Weigang Huang, Shenzhen (CN); Hongjiang Lin, Shenzhen (CN); Jun Li, Shenzhen (CN)

(73) Assignee: China Guangdong Nuclear Power Holding Corporation, Shenzhen (CN)

( * ) Notice: Subject to any disclaimer, the term of this patent is extended or adjusted under 35 U.S.C. 154(b) by 34 days.

(21) Appl. No.: 13/820,454
(22) PCT Filed: May 16, 2012
(86) PCT No.: PCT/CN2012/075614
  § 371 (c)(1),
  (2), (4) Date: May 15, 2013
(87) PCT Pub. No.: WO2012/159541
  PCT Pub. Date: Nov. 29, 2012

(65) Prior Publication Data
  US 2014/0001863 A1    Jan. 2, 2014

(30) Foreign Application Priority Data
  May 20, 2011    (CN) .......................... 2011 1 0131119

(51) Int. Cl.
  *H02J 9/04* (2006.01)
  *G21D 1/02* (2006.01)
  *H02J 9/06* (2006.01)
  *G21D 3/04* (2006.01)

(52) U.S. Cl.
  CPC ... *H02J 9/04* (2013.01); *G21D 1/02* (2013.01); *H02J 9/062* (2013.01); *G21D 3/04* (2013.01); Y02E 30/40 (2013.01)
  USPC .................................. 307/66; 307/48; 307/49

(58) Field of Classification Search
  USPC .......................................................... 307/66
  See application file for complete search history.

(56) References Cited

U.S. PATENT DOCUMENTS

| 7,379,305 B2 * | 5/2008 | Briggs et al. .................. 361/727 |
| 2008/0215302 A1 * | 9/2008 | Nasle et al. ...................... 703/13 |
| 2009/0085553 A1 * | 4/2009 | Kumar et al. ................. 323/351 |

FOREIGN PATENT DOCUMENTS

| CN | 1536731 A | 10/2004 |
| CN | 101312293 A | 11/2008 |
| CN | 102195334 A | 9/2011 |
| CN | 102255377 A | 11/2011 |
| CN | 102324757 A | 1/2012 |
| DE | 1 907 176 | 2/1969 |
| JP | 2001238368 A | 8/2001 |

* cited by examiner

*Primary Examiner* — Rexford Barnie
*Assistant Examiner* — Toan Vu
(74) *Attorney, Agent, or Firm* — Dicke, Billig & Czaja PLLC

(57) ABSTRACT

Method and system for supplying emergency power to nuclear power plant, wherein the method includes, providing accumulator battery system, connected to emergency bus, the accumulator battery system is monitored by online monitoring system; in case of power loss of electrical devices of the nuclear power plant, the online monitoring system starts the accumulator battery system to provide power supply to the electrical devices of the nuclear power plant via the emergency bus. The present application is adapt to the key technologies and battery management technologies of million kilowatt-class advanced pressurized water reactor nuclear power plant, facilitating to improve the safety of the nuclear power plant in case of serious natural disasters beyond design working conditions.

13 Claims, 10 Drawing Sheets

METHOD AND SYSTEM FOR SUPPLYING EMERGENCY POWER TO NUCLEAR POWER PLANT

FIELD OF THE INVENTION

This disclosure relates to the core technology and battery management technology for the kilowatt-class advanced Pressurized Water Reactor (PWR) nuclear power plant, also relates to the integrated optimization of energy saving technology which is combination of the core technology and battery management technology for the kilowatt-class advanced PWR nuclear power plant.

BACKGROUND OF THE INVENTION

Nuclear Power Plant (NPP) is the power generating station using the energy generated from Nuclear Fission or Nuclear Fusion reaction to produce electricity.

In order to protect the health of working personnel and the around residents from being irradiated, the design, construction and operation of NPP all follow the defense-in-depth principle, thus multiple protection are provided through the devices and means to ensure the effective control of the output power of the reactors. When various natural disasters, such as earthquake, tsunami, flood, or artificially accidents caused by fire, explosion happen, the fuel assembly of the reactor could be cooled down adequately ensuring the radioactive material not emitting to the environment.

The power supply should reflect the defense-in-depth idea either from the configuration or operation since it acts as the source of power. In order to achieve the high reliability of the power supply of NPP, emergency power supplies should be equipped with the especially important power consumption devices or devices of special requirements, multiple and independent configuration should be done to avoid the failure of the emergency power supply in case of the common mode fault.

The emergency power supply system and the normal power supply system together constitute the station power system, providing safe and reliable power supply for all the power consumption devices.

Plenty of redundant power supplies are equipped with NPP, including dedicated emergency powers, e.g., out-station main power, out-station auxiliary power and emergency stationary diesel, which do their own duties and cooperate mutually. These emergency power supplies are not only in various forms but configured in layers and multiple redundant, providing the reliable power supply for NPP to the maximum degree.

Currently, the operation modes of the station power system are as followed:

Under the normal working conditions, the power distribution system of the whole station power system are power supplied by the 26 KV busbar of generating set through the high voltage station transformer;

When the generating set is in operation, 26 KV busbar is power supplied by the main generator;

When the generator is shutdown, 26 KV busbar is down power supplied by the 400/500 KV power grid through the main transformer;

In case that 26 KV busbar loses power supply or high voltage station transformer, i.e. out-station main power, 220 KV power grid provides power supply for the safety auxiliary devices which should remain operational through auxiliary transformer to maintain the reactor in thermal shutdown state;

In case that the out-station main power and out-station auxiliary lose power supplies, the stationary diesel generator should provide power supply to the emergency ancillary equipment which enables the reactor enter cold-shutdown state;

In case that any one set of the emergency diesel generators is disabled, the additional emergency diesel unit take the place to perform the function of the emergency diesel generators, to provide the power supply for the dedicated safety devices, removal of the resident heat of the reactor core and spent fuel pool.

However, there are some limitations to the stationary diesel generator units. In case of the power supply failure, as the final emergency power supply, the stationary diesel generator units could not survive the flooding disaster such as floods, tsunami, typhoon, etc., due to its characteristics. In case that the extreme natural disaster exceeding the design standard happens, the stationary diesel units are easy to lose the power supply capability, are incapable of providing the power supply for the removal of the resident heat of the reactor core and spent fuel pool, resulting in disastrous consequences.

SUMMARY OF THE PRESENT INVENTION

The present invention aims to overcome the deficiencies of the prior art described above, providing a method and system to supply emergency power to the nuclear power plant.

In order to achieve the above objects, according to one aspect of present disclosure, the present disclosure provides a method to supply emergency power to the nuclear power plant, comprising: providing accumulator battery system, which connects to the emergency bus, an online monitoring system monitors the accumulator battery system; in case of loss of power in the electrical equipment of the nuclear power plant, the online monitoring system actuates the accumulator battery system to provide the power supply to the electrical equipments through the emergency bus.

According to the other aspect of present disclosure, a system supplying emergency power to the nuclear power plant corresponding to the above method is provided.

The method and system to supply emergency power to the nuclear power plant provided by the present disclosure could withstand the conditions beyond design basis like serious natural disasters, such as earthquake plus tsunami, which the current emergency power supply system could not survive. The method and system to supply emergency power to the nuclear power plant provided by the present disclosure takes the design basis and beyond design basis of the nuclear power plant into consideration, enables the nuclear power plant work normally under serious natural disaster circumstance, decrease the melting probability of the reactor core, thus improves the safety of the nuclear power plant.

DETAILED DESCRIPTION

Figure 1:
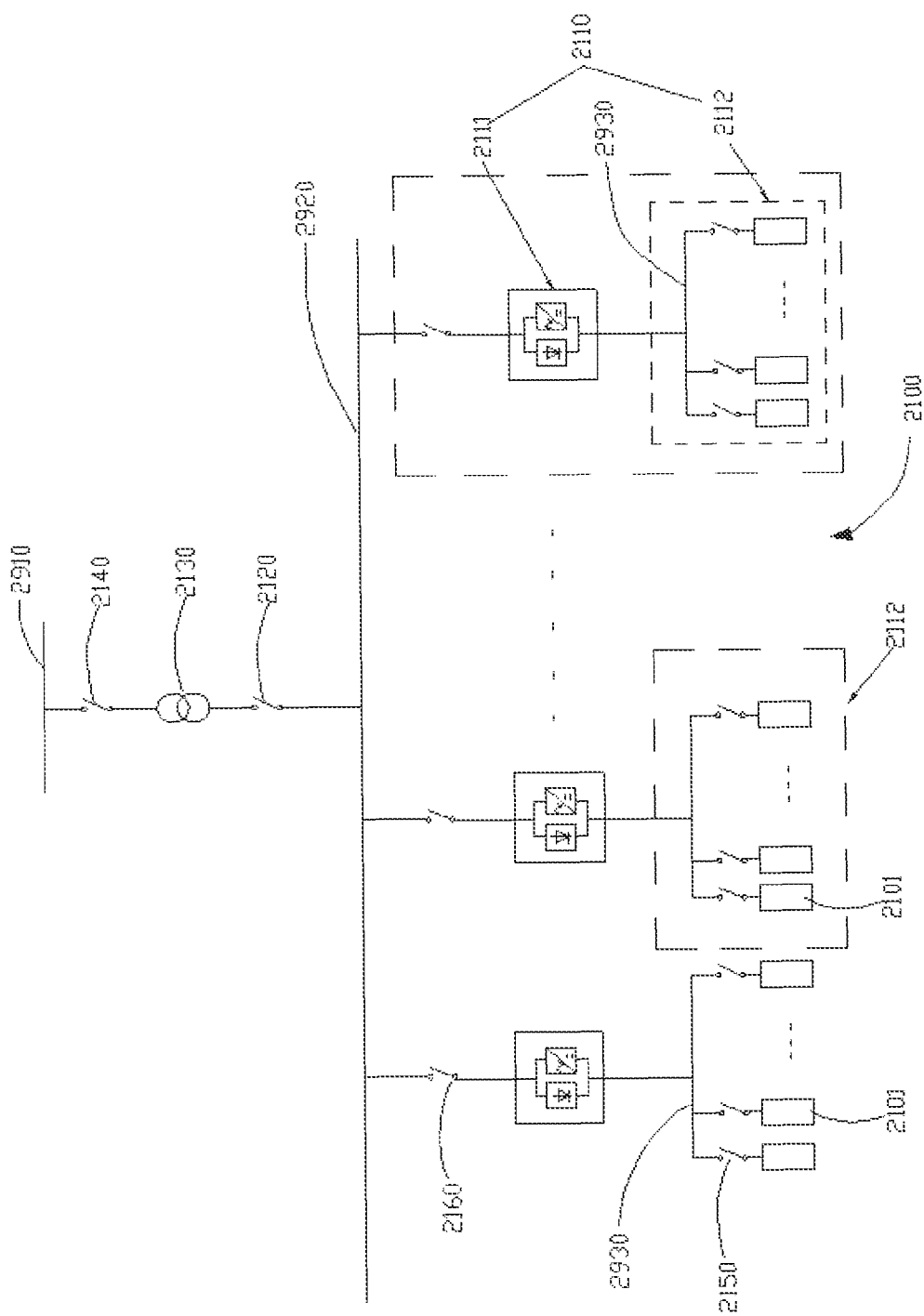
FIG. 1 illustrates the overall schematic diagram of the accumulator battery system according to one embodiment of the present invention.

As shown in FIG. 1, the method to provide emergency power supply for the nuclear power plant according one embodiment of the present invention includes, providing accumulator battery system 2100, which is connected to emergency bus 2910, an online monitoring system monitors the accumulator battery system 2100; in case of power loss of the electrical devices of the nuclear power plant, the online monitoring system actuates the accumulator battery system 2100 to provide power supply for the electrical devices of the nuclear power plant through the emergency bus 2910. The electrical devices includes cooling system, electronic instruments, control system, monitoring system or lighting system, etc. In this embodiment, the system to provide emergency power supply for the nuclear power plant is used to provide power supply for the station emergency devices to ensure the normal power supply of the station emergency devices under extreme conditions.

In one embodiment, a system corresponding to the method in above embodiment to supply the emergency power for the nuclear power plant is provided, which comprises: accumulator battery system 2100 and online monitoring system electrically connected to the accumulator battery system 2100, which is connected to the electrical devices of the nuclear power plant through the emergency bus 2910.

The online monitoring system can be used to monitor the accumulator battery system 2100 and the states of other related circuits and devices; under normal circumstances, the accumulator battery system 2100 can be charged using the proper means like station power grid or external power grid, is thus readily available. Once emergency happens or the other emergency power supplies are damaged or don't work normally, the accumulator battery system 2100 could provide power supply for the relating electrical devices of the nuclear power plant to maintain the relating electrical devices in normal working states, resulting in ensuring the safety of the nuclear power plant effectively.

The states of the relating devices such as single battery, converter, battery array, could be inspected in real time via the setting of the online monitoring system, and the automatic intellectual switch functionality of the relating devices could be realized, such as fault diagnosis, self-healing of the relating faulty devices, automatic isolation of the faulty devices, to avoid the fault to expand which may result in system failure.

In one embodiment, the system to provide emergency power supply for the nuclear power plant is located in appropriate place which is higher than the sea level and distant from the reactor of the nuclear power plant appropriately. The accumulator battery system is configured to have one set or at least two sets. In case of two sets, each set of the accumulator battery systems is connected to the independent emergency bus respectively; accordingly, the accumulator battery systems could be distributed in different locations. Since the single accumulator battery system could satisfy the design requirements of the nuclear power plant, at least two sets of the accumulator battery systems are configured to ensure that the other accumulator battery system could undertake the power supply under emergency circumstances even though one set of the accumulator battery may be damaged in the extreme natural disaster. Additionally, at least two sets of the accumulator battery systems are set to extend the power supply time at least twice under emergency conditions, thus extending the time limit for removing the emergency and facilitating the safety of the nuclear power plant.

In one embodiment, the accumulator battery system 2100 comprises of multiple parallel accumulator system modules 2110 which are used to reach the required capacity. The accumulator system module 2110 is electrically connected to the online monitoring system and to the emergency bus 2910 through the bus rod 2920. In one embodiment, accumulator system modules 2110 are all in parallel connection to the emergency bus rod 2920. In specific applications, corresponding quantity of the accumulator system modules 2110 could be selected according to the design supply duration of the accumulator battery system 2100. The design capacity of the accumulator battery system 2100 should be more than the actual required capacity, even though some accumulator system modules fail or are damaged, these faulty modules could be disconnected from the bus rod 2920 through the online monitoring system, the remaining accumulator system modules 2110 could work reliably and satisfy the actual requirements, ensuring the reliability of the accumulator battery system 2100, thus ensuring the reliability of the power supply under emergency conditions, resulting in achieving the design goal of increasing the safety of the nuclear power plant.

The accumulator system modules utilize the modular design which makes the adjustment of the quantity of the accumulator system modules connected to the bus rod 2920 to be convenient. In one embodiment, the corresponding interfaces and wiring could be reserved on the bus rod 2920, on the one hand, the accumulator battery system 2100 could be flexibly designed to be adapted to the different power and capacity requirements according to the actual situation like different loads, on the other hand, the redundant design requirements could be conveniently followed, the amount of the accumulator system modules 2110 could be increased according to the actual situation, and the only thing to do is to connect the additional accumulator system modules to the bus rod 2920, which makes the expansion, upgrade, use, maintenance to be significantly convenient.

In one embodiment, accumulator system module 2110 comprises of converter 2111 and battery array 2112, the battery array 2112 is connected to bus rod 2920 through converter 2111. The battery array 2112 includes multiple battery units 2101, the multiple battery units 2101 is parallel to the converter 2111 through DC bus 2930 to increase the capacity of the battery array 2112. Even though one of the battery units fails, the faulty battery unit could be disconnected with the DC bus and the other backup battery unit in normal working state could be parallel to the DC bus, which does not influence the power supply from the battery array, as a result, the operation safety of the nuclear power plant can be further improved. Modular design could be done to the battery array 2112, with which appropriate number of battery units 2101 are connected to the DC bus 2930, on the one hand, the battery array 2112 could be flexibly designed to be adapted to different power and capacity requirements, on the other hand, the redundant design requirements of the nuclear power plant could be followed conveniently. In case that the battery units 2101 are to be added according to the actual situation, the only thing to do is to connect the additional battery units 2101 to the DC bus, which makes the expansion, upgrade, maintenance of the accumulator battery system 2100 to be significantly convenient.

With the converter 2111 and online monitoring system configured, the operation modes of the accumulator system modules 2110 can be flexible, different accumulator system module can either work in synchronization or work independently. For example, some accumulator system modules 2110 can be discharged to the load, at the same time, the other accumulator system modules 2110 can be charged or standby. Alternately, one or more accumulator system module 2110 can charge the other one or more accumulator system module 2110, which brings great convenience to maintenance, use and testing.

In one embodiment, the battery units 2101 comprise of single batteries which are in series and/or parallel connection. Since the voltage, current and capacity of single battery are all low, the voltage of battery units can be increased in series connection, and current of battery units can be increased in parallel connection. For example, the voltage of single battery is 2V, the design voltage of the battery unit 2101 is 600V, 300 single batteries in series connection are needed to form the 600V battery unit 2101.

In one embodiment, a first switch control unit 2160 is configured between the accumulator system modules 2110 and bus rod 2920. The first switch control unit 2160 is connected to the online monitoring system and controlled by the online monitoring system to switch accumulator system modules 2110 automatically. A second switch control unit 2150 is configured between the battery units and converter. The second switch control unit 2150 is connected to the online monitoring system and controlled by the online monitoring system to switch the battery units 2101 automatically. With this design, once the online monitoring system detects that the parameters such as voltage, current, capacity or temperature of any accumulator system module or battery unit is out of the predefined extent, it could switch to the backup accumulator system module or battery unit, thus the system has high reliability.

In one embodiment, manual operation mechanism is configured in the first switch control unit 2160, with which the operator could connect or disconnect the accumulator 2110 to the bus rod 2920 manually. In case of unexpected accident, the operator could connect the accumulator system module 2110 to the emergency 2910 manually to provide power supply to the emergency devices, or; manual operation mechanism is configured in the second switch control unit 2150, with which the operator could connect or disconnect the battery units to the DC bus manually.

In one embodiment, low-voltage switch 2120 is connected to the bus rod 2920, transformer 2130 is connected to the low-voltage switch 2120, which increases the output voltage of the accumulator battery system 2100 to appropriate level. The transformer 2130 is connected to the emergency 2910 via medium-voltage switch or high-voltage switch. In this embodiment, the output voltage of accumulator battery system 2100 is 380V, which is converted to 6.6 KV high voltage via transformer 2130 to supply the emergency bus 2910.

In one embodiment, wherein an accumulator system module could be used to charge another accumulator system module if necessary. Because battery not charging or discharging for long time may influence their performance and life, the accumulator system modules are to be charged or discharged under artificial control in periodic inspection or testing of the devices of the nuclear power plant. With this kind of design, when the accumulator system module is needed to be charged or discharged, the designated accumulator system module is connected to a load for complete discharging, then one another accumulator system module may charge the discharged accumulator system module until fully charged, and so on. For example, accumulator system module A is connected to a load or in other appropriate way to be discharged, accumulator system module B is set to forced discharge mode to charge accumulator system module A, after accumulator system module B is discharged, accumulator system module C is set to forced discharge mode to charge accumulator system module B, and so on, the last discharged accumulator system module could be charged by the internal power grid or in other appropriate way, thus, very small amount of power is needed for charging and discharging of all the accumulator system modules. Especially, in case of MW level of the capacity of the accumulator battery system, the charging cost may be high and it is not environmentally friendly if all the storage battery units are connected to the internal power grid or external power grid for charging. With the above-mentioned embodiment, not only the requirements of inspection, testing and maintenance can be met, but the operation cost could be cut. Additionally, in the charging and discharging process, only a few accumulator system modules are in the state of no power, as long as the number of the accumulator system modules of no power is no more than the design margin of the redundant design, the accumulator system modules in the state of power of the accumulator battery system can meet the requirements of emergency power supply even though the disaster beyond the design basis happens in the process of charging and discharging. So the accumulator battery system can provide power supply for the emergency devices whenever it is in normal working state or in charging and discharging state.

The operation modes include but are not limited to the following besides the normal charging and discharging (the following operation modes could be realized with the selection of operation modes of converter):

(1) Average charge: when the battery array needs to be charged after the capacity decreases to some extent or the discharging process is accomplished, average charge mode is set for the accumulator system module, which not only makes the battery array store as much power as possible, but facilitates to extend the service life of the accumulator system module.

(2) Forced charge: In case that the nuclear power plant faces power loss risk, e.g. online monitoring system detects that the emergency system power supply duration is below the predefined safe value, the forced charging should be done to the battery array to ensure the battery array to store as much power as possible in minimum time, which may influence the service life of the battery array somehow, but ensure the power supply safety of the nuclear power plant to the maximum extent with the extension of the supply time of the accumulator battery system.

(3) Forced discharge: under normal working conditions, forced discharge could realize the discharging testing of a accumulator system module and transferring the power to one another accumulator system module; in case of emergency, forced discharge could make the accumulator system module to output power as much as possible until the battery array is damaged. Although the service life of battery array may be shorten, the supply time of the accumulator battery system could be extended to the maximum extent.

In one embodiment, the power supply modes from the accumulator battery system to the electrical device of the nuclear power plant started by the online monitoring system include isolated island operation mode and non-isolated island operation mode, the steps to control power supply include: online monitoring system determines plant-wide power failure of the Nuclear power plant, sending isolated island start command to accumulator battery system to enter isolated island operation mode, controlling the accumulator battery system to provide power supply to the power loss devices, wherein the steps of controlling the accumulator battery system to provide power supply to the power loss devices include: controlling accumulator battery system to drive the Hydrotest Pump Turbine Generator Set and its control system to work normally; controlling the accumulator battery system to drive auxiliary feed-water system to work normally; In case that the power grid is retrieved and the grid side voltage of the breaker of the grid is normal and maintains for predefined time, the outlet breaker of the accumulator battery system is switched off, entering non-isolated island operation mode. In the isolated island operation mode, accumulator system provides power supply to the Hydrotest Pump Turbine Generator Set through the emergency bus automatically to ensure the water supply to the main pump shaft seal and power supply to the instrument control system of the main control room, and power supply to the control system of the accumulator system itself to ensure the normal working of the accumulator system. Because the accumulator system enters with-load condition instantaneously when entering isolated island operation mode, the voltage of 380V AC may have sag phenomenon, after the accumulator system passes the self-inspection and feedbacks normal voltage of the power supply, the power switch of the auxiliary watering system could be actuated manually. Once the accumulator enters planning isolated island operation mode, it may be continuously discharged until totally discharged unless the external power grid retrieves. In one embodiment, after the accumulator system enters non-isolated island operation mode, the voltage of the accumulator battery system and the first voltage threshold value are determined, in case that the voltage of the accumulator battery system is less than the first threshold value, the accumulator battery system is controlled to be charged with the external power grid, then the voltage of the accumulator battery system and the second voltage threshold value, in case that the voltage of the accumulator battery system is more than the first voltage threshold value and equal to the second voltage threshold value, the charging of the accumulator battery system could be terminated. In one embodiment, the online monitoring system also inspects the voltage and frequency of the external power grid in real time, determines whether the voltage or frequency of the external power grid reaches predefined protection threshold value or not; in case that any one of the voltage and frequency of the external power grid reaches the predefined protection threshold value, the online monitoring system determines whether the isolated island operation mode starting command is received or not, if not, anti-non-planned isolated island protection signal is output to prevent the accumulator battery system from entering non-planned isolated island mode.

In one embodiment, the system to provide the emergency power supply for the nuclear power plant further includes portable accumulator battery system, the portable accumulator battery system includes more than one vehicle-mounted accumulator system modules, the vehicle-mounted accumulator system module includes accumulator battery modules and portable vehicle-mounted carrier, the online monitoring system is further used to connect at least one vehicle-mounted accumulator system module when the total capacity of the accumulator battery system could not afford the load capacity under current working conditions. For example, the portable accumulator battery system is used to charge the stationary accumulator battery system, or the vehicle-mounted accumulator modules are connected to the electrical devices of the nuclear power plant through the emergency bus. The capacity inspection and switch control of the vehicle-mounted accumulator system modules could be performed referring to the stationary accumulator system modules. In one embodiment, portable vehicle-mounted carrier includes vehicle-mounted shell, the battery compartment fixed on the vehicle-mounted shell, at least two wheels or rollers disposed at the bottom of the vehicle-mounted shell.

Figure 2:
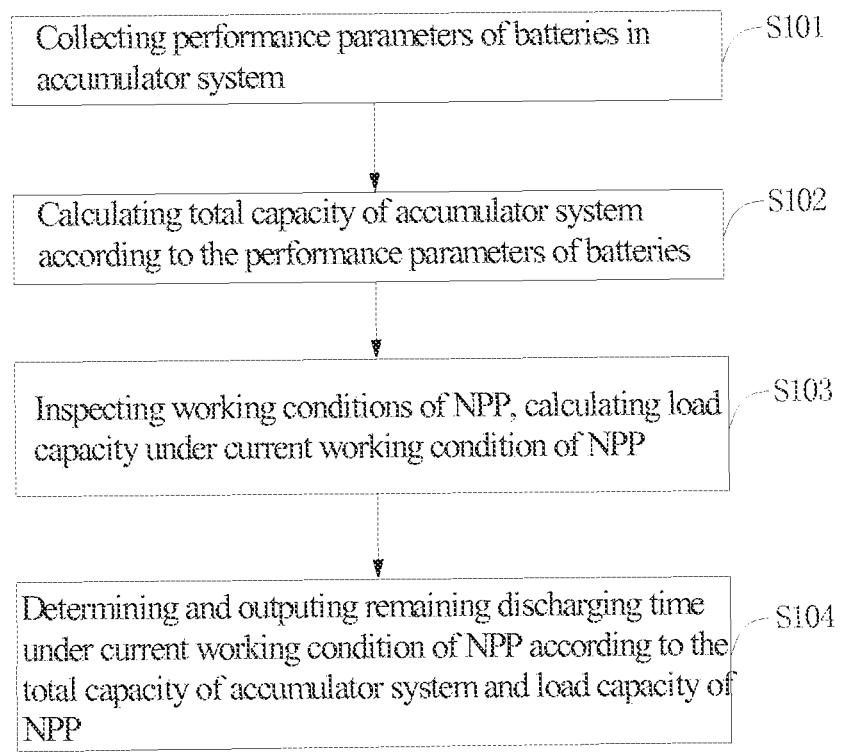
FIG. 2 shows the flowchart of monitoring procedure of the accumulator battery system by the online monitoring system according to one embodiment of the present invention.

FIG. 2 illustrated a process the online monitoring system monitors the accumulator battery system according to one embodiment of the present invention, the steps are:

In step S101, the performance parameters of the batteries in accumulator system are acquired.

The performance parameters are at least one of the performance parameters of single battery, the performance parameters of battery units or performance parameters of battery array. The performance parameters include but are not limited to the capacity, voltage, current, temperature, internal resistance of the collected objects.

In one embodiment, the acquisition devices are connected to the battery units through the field bus and used to collect the performance parameters of the batteries in accumulator system. In one embodiment, the acquisition devices are connected to the pin type terminal block of the single battery of the accumulator system via field measurement bus to collect the voltage and temperature of each single battery in accumulator system, and the voltage and temperature of the battery units as well. Wherein the acquisition devices are any devices capable of collecting the above-mentioned information, such as acquisition interface board, I/O communication unit or data acquisition card, not limited to the above examples.

Figure 3:
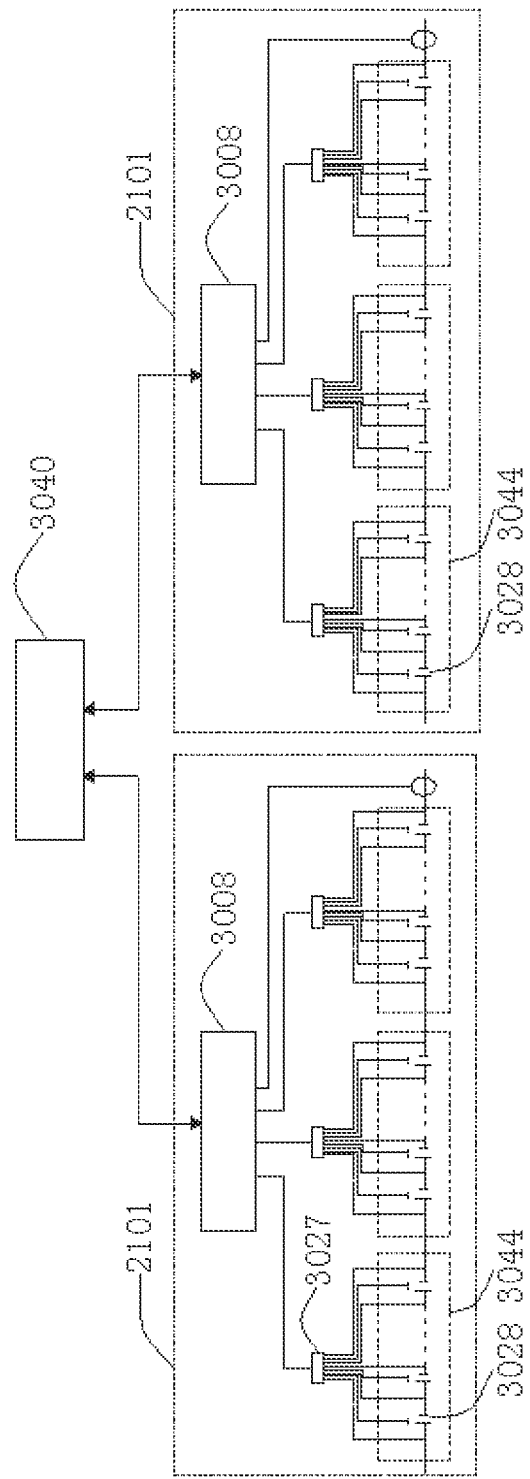
FIG. 3 illustrates the exemplary diagram of reading the battery performance parameter from the battery module monitor according to one embodiment of the present invention.

In another embodiment, the accumulator system includes battery unit monitor 3008 which can monitor and control the state of each battery unit 2101. The battery unit monitor 3008 could be used to read the performance parameters, as shown in FIG. 3. Wherein the battery unit monitor 3008 is the device that does the information collection and communicates with the online monitoring system 3040.

In step S102, the total capacity is calculated according to the performance parameters.

Because the performance parameters include at least one of the capacity of each single battery, capacity of battery unit, capacity of the battery array composed of plurality of battery units, the total capacity of the accumulator could be calculated according to the performance parameters of the batteries. For example, summation of the capacity of all single batteries could deduce the total capacity of the accumulator system, or summation of the capacity of all battery units could deduce the total capacity of the accumulator system, or summation of the capacity of the battery array could deduce the total capacity of the accumulator system.

In step S103, the working conditions of the nuclear power plant is inspected and the load capacity under current working conditions could be calculated according to the working conditions of the nuclear power plant.

Wherein the working conditions of the nuclear power plant includes but is not limited to normal operation and power loss mode, reactor shutdown and power loss mode, safety injection and power loss mode, loss of coolant accident of reactor and power loss mode, and extreme accident mode. Wherein the normal operation and power loss mode is that the external power supply is lost when the power of the reactor is between 0% and 100% of the design power; the safety injection and power loss mode is that the external power supply is lost when there is the safety injection signal of starting safety injection system and auxiliary watering system; LOCA and power loss mode is that the external power supply is lost when there is the safety injection signal of starting safety injection system and auxiliary watering system and the signal of starting containment spray system; the extreme accident mode is that the external power supply is lost when there is leakage of radioactive material.

In one embodiment, the following steps are followed to inspect the working conditions of the nuclear power plant: inspecting whether the external power supply is lost; inspecting the temperature, pressure and boron concentration of the coolant of the reactor cooling system, the safety injection signal of the safety injection system, and containment pressure signal of the containment spray system; comparing the above inspected signals with the pre-stored correspondence between the working conditions and signals to deduce the current working conditions of the nuclear power plant.

In one embodiment, the load capacity under current working conditions is calculated according to the relationship between the working conditions and the load capacity of the nuclear power plant. The relationship between the working conditions and the load capacity of the nuclear power plant is the minimum load capacity provided to the nuclear power plant under each working conditions. For example, Normal operation and power loss mode: LHA (6.6 KV AC Emergency Power Distribution—Train A) bus supplies 5005 KW, LHB bus supplies 4545 KW, i.e., when the nuclear power plant is in normal operation mode, if the accumulator system provides power supply through LHA bus, the load capacity is 5005 KW, if the accumulator system provides power supply through LHB (6.6 kV AC Emergency Power Distribution—Train B) bus, the load capacity is 4545 KW.

Reactor shutdown and power loss mode: LHA bus supplies 4705 KW, LHB bus supplies 4240 KW;

Safety injection and power loss mode: LHA bus supplies 5230 KW, LHB bus supplies 4770 KW;

LOCA and power loss mode: LHA bus supplies 4990 KW, LHB bus supplies 4595 KW;

Extreme accident mode: a RIS (Safety Injection System) pump needs power supply of 355 KW, a SEC (Essential Service Water) pump needs power supply of 315 KW, a RRI (Component Cooling) pump needs 600 KW, LNE (Uninterrupted 220V AC Power) 306CR (Marshalling Box) needs power supply of 16 KW. When the nuclear power plant is in extreme accident mode, the load capacity is 355 KW+315 KW+600 KW+16 KW=1286 KW.

In other embodiments, the power of each device of the nuclear power plant under various working conditions included in nuclear power plant accident procedures could be read. The nuclear power plant accident procedures regulates what devices should be power supplied, what devices may not be power supplied, how much power should be supplied under different working conditions. The load capacity could be calculated through the summation of the power of each device of the nuclear power plant under current working conditions.

In step S104, the remaining discharging time under current working conditions is calculated and output according to the total capacity of the accumulator system and load capacity of the nuclear power plant.

With the key operation parameters being inspected in real time, the issues that the key operation parameters of the nuclear power plant are not able to be inspected by the online monitoring system and the operation states especially the accident states can not be determined are solved. According to the predetermined relationship between the working conditions and the load capacity of the nuclear power plant combined with the remaining discharging time of the accumulator system under current working conditions of the nuclear power plant, the issue that the current online monitoring system of the accumulator system can not provide the remaining discharging time of the accumulator system acting as the emergency power supply of the nuclear power plant has been solved.

In other embodiments, after the remaining discharging time of the accumulator system under current working conditions is determined according to the total capacity of the accumulator system and load capacity of the nuclear power plant, comprising: uploading the remaining discharging time of the accumulator system, working conditions of the nuclear power plant and total capacity of the accumulator system to the main control room or the emergency command center of the nuclear power plant. With the relating information being uploaded to the main control room and the emergency command center of the nuclear power plant, the remaining discharging time could be monitored under different working conditions by the operators, providing the information support for instant and high efficient and accurate artificial control to the accumulator system and nuclear power generating units of nuclear power plant, which is also the prerequisite to avoid major safety accident or limit the expansion of accident, resulting in greatly improving the operation safety of the nuclear power plant. With the relating information being uploaded to the main control room and the emergency command center of the nuclear power plant, in case that serious nuclear accident happens, the emergency command experts in the emergency command center of the nuclear power plant can also be aware of the power storage status of the accumulator system in time, and make rapid determination of emergency strategy and emergency response plan, which may limit the further deterioration or upgrade of the serious nuclear accident, preventing the people from being hurt by the leakage of the nuclear radiation.

In other embodiments, after the remaining discharging time of the accumulator system under current working conditions is determined according to the total capacity of the accumulator system and load capacity of the nuclear power plant, further comprising: uploading the total capacity of the accumulator system to the recorder of the main control room, which could output the total capacity of the accumulator system instantly and display the historical trends of the total capacity of the accumulator system, making the operator of the nuclear power plant to do the comprehensive monitoring of the total capacity in real time instantly and efficiently, resulting in improving the safety of the nuclear power plant.

In other embodiments, after the performance parameters of the batteries in the accumulator system are collected, further comprising: determining whether the state of each single battery of the accumulator system is normal or not, in case of determination of being abnormal, locating the physical position of the single battery whose state is abnormal. In one embodiment, when the performance parameters meet at least one of the following conditions, the single battery is determined to be abnormal: the current of DC bus is more than the normal discharging current; the voltage is lower than the cut-off voltage or higher than the allowable voltage; the temperature is higher than the rated temperature. In one embodiment, the address of the abnormal signal representing the single battery whose state is abnormal, the physical position of the single battery whose state is abnormal is located according to the address of the abnormal signal.

In other embodiments, after the performance parameters of the batteries in the accumulator system are collected, further comprising: determining whether the battery units are defective or not, in case that the battery units are defective, the faulty battery unit is isolated, for example, disconnecting second switch control unit between the faulty battery unit and DC bus, put the backup battery units into operation. In one embodiment, the steps to determine whether the battery units are defective are as followed: whether the state of each single battery in accumulator system is abnormal or not is determined according to the performance parameters of the batteries in accumulator system; in case that the change of voltage or current of the battery unit is beyond the predetermined allowable error range due to the single battery abnormalities, the battery unit wherein the single batteries are abnormal is determined to be faulty.

In other embodiments, after the faulty battery units are isolated, further comprising: resetting the battery units after troubleshooting manually or automatically.

In other embodiments, the process further comprises: in case of inspection of abnormal single battery, local alarm is given to the faulty single battery, in case of inspection of faulty battery units, local alarm and remote alarm of main control room are given to the faulty battery units.

In other embodiments, the process further comprises: receiving the instructions of main control room and putting the battery units in the accumulator system into operation or cut off the battery units. For example: the structure of the accumulator system is output from the display devices in main control room through the interactive interface, the user could click any one of the second switch control units in the interactive interface to input the command to put the battery unit into operation or to cut off the battery unit, the online monitoring system would close the corresponding second switch control unit according to the command of putting the battery unit into operation from the main control room to control the corresponding battery unit to be put into operation, and open the corresponding second switch control unit 2150 according to the command of cutting off the battery unit from the main control room to control the corresponding battery unit to be cut off.

In other embodiments, the process further comprises: monitoring the voltage of the emergency bus, in case that the duration of the power loss of the emergency bus is beyond the predetermined time, the signal to put into operation is generated, the accumulator system is put into operation acting as the emergency power supply according to the system signal of putting into operation. Wherein the system signal of putting into operation is used to instruct that the accumulator system is needed to put into operation as emergency power supply. In one embodiment, the predetermined time could be 9.7 s.

In other embodiment, the process further comprises: In case that no signal of putting into operation is generated, and the voltage of the accumulator system modules in accumulator system is lower than the predefined charging voltage, and the converter of that accumulator system module is available, the accumulator system module is charged. Accordingly the battery units in accumulator system could be charged with external power supply instantly, ensuring the accumulator to be full of the power which can handle the five power supplies loss accident and the single battery to be in best condition which makes the accumulator system to reach the maximum design life.

In one embodiment, the procedure of putting the accumulator system into operation as the emergency power supply according to the system putting in operation signal includes:

Firstly, the first accumulator system module of the accumulator system is put into operation. Wherein the first accumulator system module is the accumulator system module which is put into operation in the first place, which could be any one of the accumulator system modules. In one embodiment, the first switch control unit between the converter of the first accumulator system module and bus rod could be closed directly to put the first accumulator system module into operation. In other embodiments, in order to get better effect of putting into operation, before the first accumulator system module is put into operation, the process further includes: step A: determining whether the converter in the first accumulator system module is available or not, performing step B if available, performing step C if not; step B: putting the first accumulator system module into operation; step C: reselecting one accumulator system module of the accumulator system as the first accumulator system module, restarting to put the first accumulator system module into operation. The accumulator system module put into operation could be ensured to provide power supply normally with the above determination process.

In other embodiment, after that the first accumulator system module is determined to be available, the process further includes: monitoring the voltage of the first accumulator system module and determining whether the voltage of the first accumulator system module reaches the cut-off voltage, if not, putting the first accumulator system module into operation, otherwise, reselecting one accumulator system module as the first accumulator system module and putting it into operation. Because the voltage of the accumulator system module reaching the cut-off voltage represents that it is difficult to make the accumulator system module to achieve good power supply, which should not be put into operation, resulting in further improving the supply efficiency and stability of the accumulator system.

In other embodiments, when the voltage of the first accumulator system module is determined to not reach the cut-off voltage, the process further includes: determining whether the first switch control unit of the first accumulator system module is closed, if yes, representing the putting into operation is a success, otherwise closing the first switch control unit of the first accumulator system module.

After the first accumulator system module is put into operation, the second accumulator system module is to be put into operation, the above step is executed in loop until all the accumulator system modules are put into operation or the accumulator meets the power requirements. In one embodiment, whether the power requirement of the accumulator system is met could be determined through inspecting the power of bus rod, wherein the power requirements of the accumulator system is the total power of the load of the current bus rod.

The second accumulator system module is the accumulator system module other than the first accumulator system module. In one embodiment, the process to put the second accumulator system module includes: step A: determining whether the converter of the second accumulator system module is available or not, if yes, performing step B, otherwise, performing step C; step B: putting the second accumulator system module into operation and parallel in the grid. For example, inspecting the frequency and phase angle of the bus rod, and the frequency and phase angle of the second accumulator system module; once the frequency difference and phase angle difference between the second accumulator system module and the bus rod are less than the predefined values respectively, putting the second accumulator system module. Step C: reselecting one accumulator system module as the second accumulator system module and putting it into operation. Through the above determination, the second accumulator system module put into operation could be ensured to provide power supply normally.

In other embodiments, in case that the converter of the second accumulator system module is determined to be available, the process further includes: monitoring the voltage of the second accumulator system module and determining whether the voltage reaches the cut-off voltage, if not, putting the second accumulator system module, otherwise, reselecting one accumulator system module from the accumulator system as the second accumulator system module and putting it into operation. The above process could further improve the power efficiency and stability of the accumulator system.

In other embodiments, in case that the voltage of the second accumulator system module is determined to not reach the cut-off voltage, the process further includes: determining whether the first switch control unit of the second accumulator system module is closes or not, if yes, representing that the putting into operation is a success, otherwise, closing the first switch control unit of the second accumulator system module.

In other embodiments, after the accumulator system is put into operation, the process further includes: in case that the difference between the power of the bus rod and power requirement of the accumulator system exceeding the power of single accumulator system module is inspected, disconnecting a accumulator system module from the accumulator system modules put into operation, the above step is performed in loop until the difference between the power of the bus rod and the power requirement of the accumulator system is less than the power of single accumulator system module.

In case that the extreme natural disaster beyond the design basis happens, the nuclear reactor might probably be terminated completely and the station power might be lost, and the transmission lines connected to the external power grid might probably be interrupted due to the wire rod collapse caused by earthquake, typhoon, and the external emergency power supplies don't work either. Under such conditions, comparing with the stationary diesel generator unit as final emergency power supply, the accumulator battery system provided by this application has obvious advantages: firstly, the batteries can word in a completely isolated space not influenced by the disasters. Considering the heat generated by the charging and discharging of the batteries, air-conditioners or water cooling system or heat pipe radiator or hot plate radiator are used to exhaust heat. Specifically, evaporator end of the heat pipe or the hot plate is in close contact with batteries or the appropriate locations, the condensing side is placed outside of the isolated space, the heat pipe or hot plate is through the walls of the isolated space and sealed. The heat generated by the batteries evaporates the fluids in the heat pipe or hot plate and liquefies the steam, thus the heat generated by the charging and discharging of the batteries is exhausted, and the fluids of condensing side flow back to the evaporator through the capillary to form cooling cycle. Secondly, the system to supply emergency power to the nuclear power plant provided by this application could add the accumulator system module to the accumulator battery system or replace the faulty accumulator system module conveniently with the modular design, ensuring the reliable operation even in worst case. Thirdly, for the system to supply emergency power to the nuclear power plant provided by this application, the batteries supply the power instantaneously with no time interval, which is of great significance for the station emergency devices with non-interruption requirements. In one embodiment, lithium batteries are selected as the minimum unit of the power storage for the accumulator battery system, which have advantages such as good safety, small volume, long maintenance cycle, high reliability, long life.

In one embodiment, the converter could have functionalities of input reverse protection, Input over-voltage protection, output overload protection, output short circuit protection, overheating protection, ensuring the working safety of itself. The converter could also have functionalities of abnormal grid voltage protection, grid frequency abnormal protection, ground fault protection, islanding protection, ensuring the safety and reliability of the grid connected operation.

The system to supply emergency power to the nuclear power plant provided by this application could be started automatically or manually by the operator through being monitored by the online monitoring system, once the trigger condition is achieved, which could take over or complement the other emergency power supplies in the nuclear power plant to provide power supply to the station emergency devices of the nuclear power plant, greatly enhancing the capability of nuclear power plant against the disasters beyond the design basis. According to the safety probability analysis calculation of the nuclear power plant, the baseline total risk CDF (per reactor per year) is decreased to 1.67E-05 from 2.13E-05, which decreases the core meltdown probability of the reactor of the nuclear power plant about 21.6%, providing important guarantee for the safety of the nuclear power plant.

Figure 4:
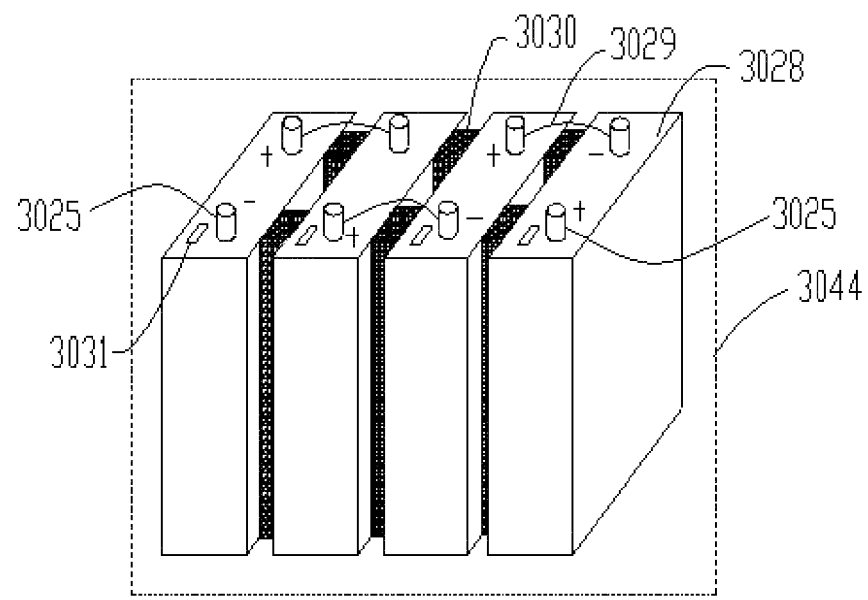
FIG. 4 shows the schematic diagram of the battery pack according to one embodiment of the present invention
Figure 5:
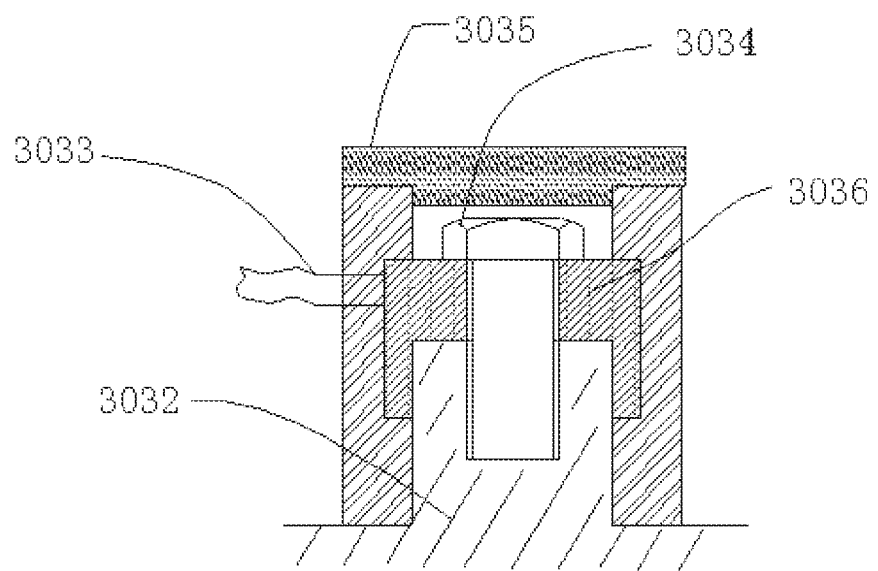
FIG. 5 shows the schematic diagram of the flexible electrical connection portion of the single battery according to one embodiment of the present invention.

Refer to FIG. 4, in one embodiment, the battery module 2101 could comprise of plurality of battery pack 3044 in serial and/or parallel connection in order to facilitate the dismounting and maintenance of the batteries. The battery pack 3044 is a module formed by plurality of single battery 3028 in serial connection. The above-mentioned construction could not only facilitate the connection, combination of the single batteries, packing, transportation and installation, but configure the needed capacity flexibly according to power supply and the safety protection requirements of the nuclear power plant. Each single battery 3028 could be arranged in row or in column serial connection, flexible pad or at least two vertical flexible strips 3030 are disposed between two adjacent single batteries 3028, which are used to prevent the damage caused by the collision between the batteries and complement the machining error of the outer surface of each single battery 3028, while the gap between the flexible strips could facilitate the air circulation to achieve cooling effect. The positive and negative pole 3025 of each adjacent single battery is electrically connected through the flexible connecting piece 3029. Refer to FIG. 5, in one embodiment, the flexible connection piece 3029 includes flexible wire 3033 and metal joint 3036 connected to the two ends of the flexible wire. The metal head 3032 of the positive, negative pole 3025 of each single battery is provided with screw hole, through which the metal joints 3036 at two ends of the flexible connecting piece 3029 could be compacted on the corresponding metal head 3032 with a bolt 3034. After the bolt 3034 is fixed, a insulation cover is used to cover it. In case of the external impact to the entire battery module 2101, such as earthquake, the flexible electric cable 3033 could withstand or absorb the impact to ensure the reliable conductivity, enabling that the battery module 2101 can be used normally. The temperature collection element and voltage collection element are disposed in the single battery 3028, which are used to send the collected temperature and voltage signal of the single battery 3028 to the signal port 3031 of the battery 3028. The signals of the signal port 3031 are sent to the aggregated terminal row of the pin type signal processing module 3027 of the battery pack, the signal processing module 3027 is connected to the battery module monitor 3008 through data transmission line, as shown in FIG. 3. In one embodiment, after the terminal row of the signal processing module 3027 is pulled out, all the corresponding single batteries 3028 are disconnected to the signal processing module 3027, which facilitates the dismounting and changing of the battery pack with the reduction of the reduction of the wiring workload.

Figure 6:
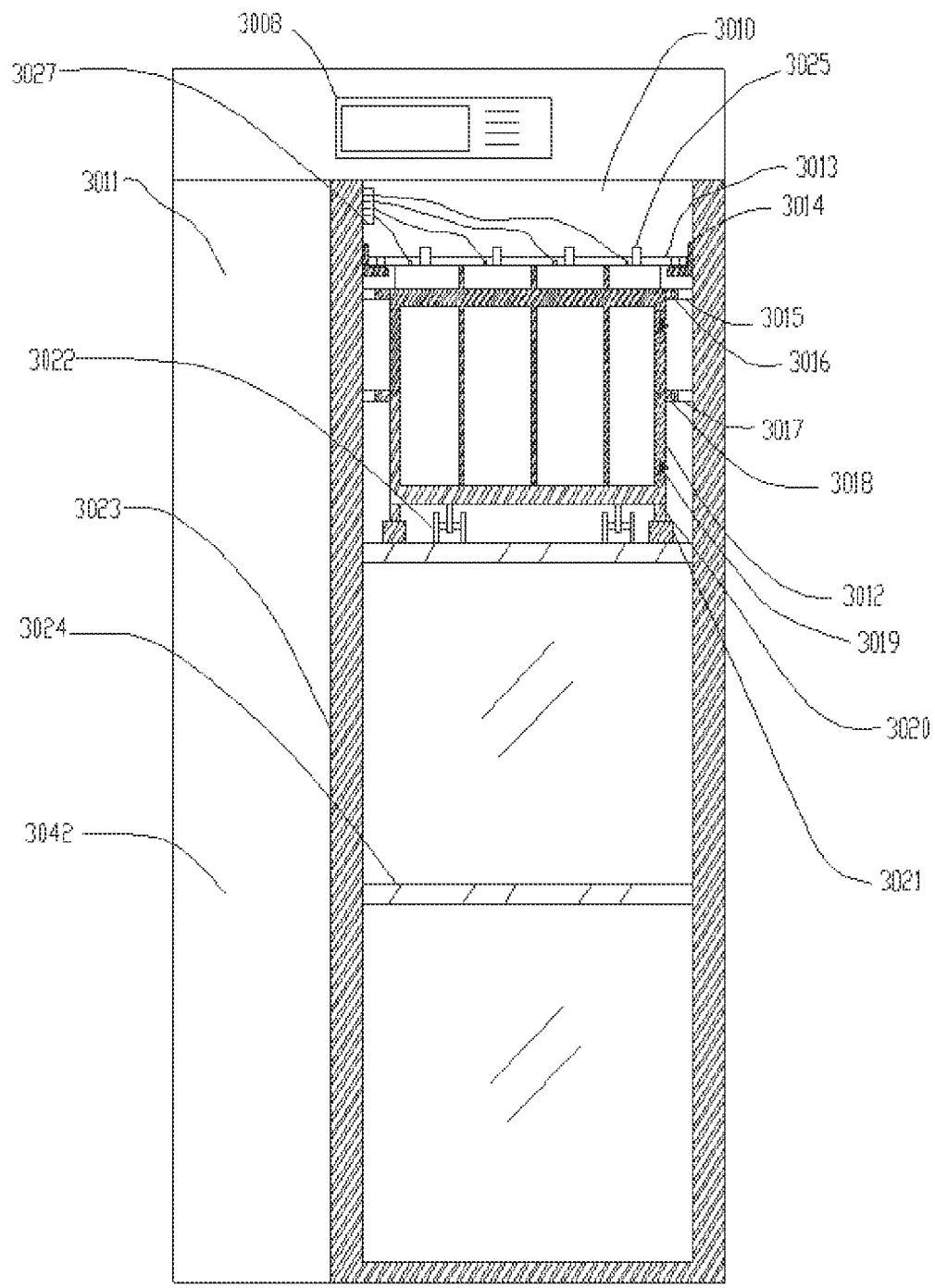
FIG. 6 illustrates the internal schematic diagram of the battery cabin according to one embodiment of the present invention.

Refer to FIG. 6, in one embodiment, In order to facilitate the convenient installation and changing, plurality of battery packs could be changeably fixed in a battery cabin 3042 (or battery rack), in which plurality of parallel bulkheads 3024 are provided with to form plurality of battery compartments 3010, the pin type signal processing module 3027 is located in the battery compartment 3010 to facilitate one-time plug of each single battery. Wiring compartment 3011 is vertically disposed on the side of battery cabin 3042, which is used to aggregate and fix various cables to prevent the cables from being scattered and intertwisted and short circuit. The battery module monitor 3008 is located inside the cabin body to facilitate the operator to observe the state parameters of each single battery of battery module 2101, and data could be transferred between the battery module monitor 3008 and online monitoring system via CAN bus communication.

Refer to FIG. 6, in one embodiment, the battery pack is first placed in battery basket 3012 having a opening at one end, then mounted on the battery compartment 3010. The battery basket 3012 is provided with a elastic piece in flexible contact with the outer side of the battery pack, which is used to prevent the battery pack mounted in the battery basket 3012 from shaking due to shock. The battery basket 3012 is provided with the second connecting piece to connect the fastening strips 3019 which is used to fasten each single battery arranged in the battery basket 3012. In order to facilitate the battery basket 3012 to be fixed in the basket compartment 3010, the fixation ear 3016 is provided on the back above the battery basket 3012, which is fixed on the localization ear 3015 of the battery compartment; fixation ear 3018 is provided in the front middle position of the battery basket 3012, which is fixed on the localization ear 3017 inside the battery compartment; there are four feet 3020 at the two ends of the bottom of battery basket 3012, which are fixed on the force bearing beam 3021.

In order to make the battery pack in the battery basket 3012 not to move up and down, the battery compartment is provided with depression bar 3013 inside which is fixed on the angle steel 3014 to compress the battery pack tightly. To facilitate the change and maintenance of the battery pack, the battery basket 3012 is provided with at least two wheels 3022 (or rollers) at the bottom; the battery pack in the battery compartment could be extracted or introduced conveniently. The cabin body of the battery cabin includes four pieces of U-steel 3023 located inside the four vertical edges and steel frame structure on the two sides of the battery compartment, and reinforced steel beam welded to the side of the cabin body; the across corners of the reinforced steel beam are welded to the adjacent U-steel to improve the structure stability of the battery cabin, even under harsh conditions such as high intensity earthquake, the reliability of the battery pack inside the battery cabin could be ensured. Bulkhead 3024 is fixed in connection with the four U-steels via retaining pieces, which could ensure reliable fixation even under extreme conditions such as earthquake. In one embodiment, the retaining pieces use the bolts above 6.8 level to ensure the structure reliability.

In other embodiments, the battery pack could be placed inside a shell, and then mounted into the battery compartment. In order to make the battery pack mounted in the shell not to shake due to the vibration, flexible pieces in flexible contact with the outer surface of the battery pack is equipped with the inner wall of the shell. In order to fix each single battery more tightly, the shell is provided with a end cap which is used to depress and fix the single battery inside the shell tightly. In order to improve the cooling performance of the battery module inside the shell, heat radiating grooves are disposed at the side and bottom of the shell. The first connecting piece is equipped at the two sides of the shell which could be fixed to the battery compartment; each battery pack could be fixed inside the battery compartment with the first connecting piece. To facilitate the change and maintenance of the battery pack, the shell is provided with at least two wheels or rollers at the bottom, the battery pack in the battery compartment could be extracted or introduced conveniently by the operator.

Figure 7:
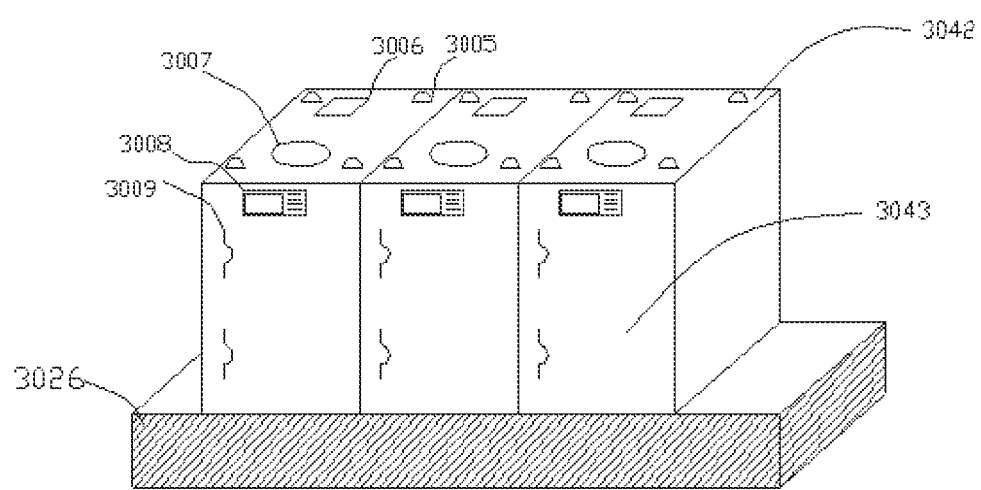
FIG. 7 illustrates the arrangement diagram of the battery cabin according to one embodiment of the present invention.

Refer to FIG. 7, in one embodiment, the battery cabin 3042 is provided with mounting component at the bottom, the cabin body of the battery cabin is fixed to the cement platform 3026 in which there are embedded parts, the embedded parts are provided with screw holes. The mounting component at the bottom of the battery cabin is locked tightly into the screw holes of the embedded parts via fasteners. In one embodiment, the fasteners are bolts with anti-loosing spring washer to facilitate the reliability of the construction. The battery cabin 3042 is provided with lifting ears 3005 at the top to facilitate the lifting in installation phase. The battery cabin 3042 is provided with cable holes 3006 at the top which are used to fix the cables. The cable holes 3006 are blocked with fireproof material. There are doors 3043 in the front and at the rear end. After the two doors are open, the operations in two directions could be performed to the devices inside the battery cabin 3042. The doors 3043 are provided with upper and lower locking handles. There are air admission shutters at the rear end of the battery 3042 and exhaust fan on the top of the battery 3042 to exhaust the heat inside the cabin, improving the cooling performance of each battery module 2101 and the service life of the batteries.

Figure 8:
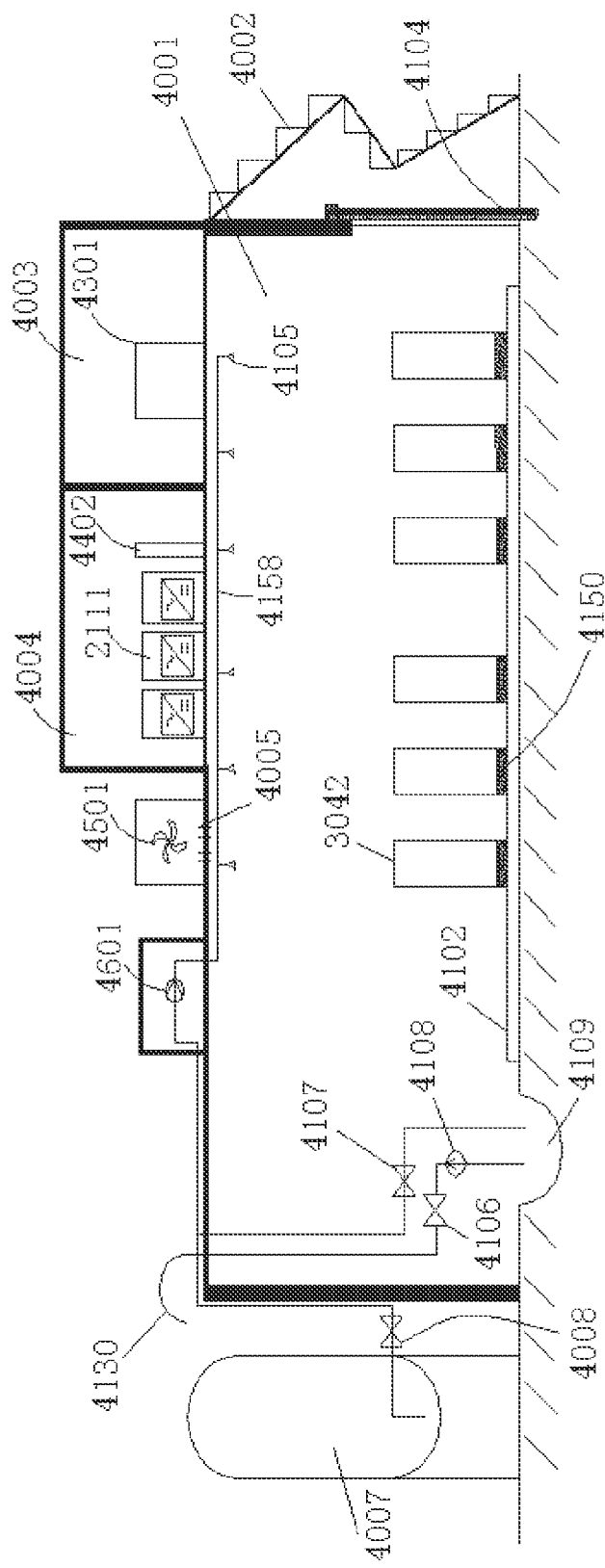
FIG. 8 illustrates the schematic diagram of the storage device according to one embodiment of the present invention.
Figure 9:
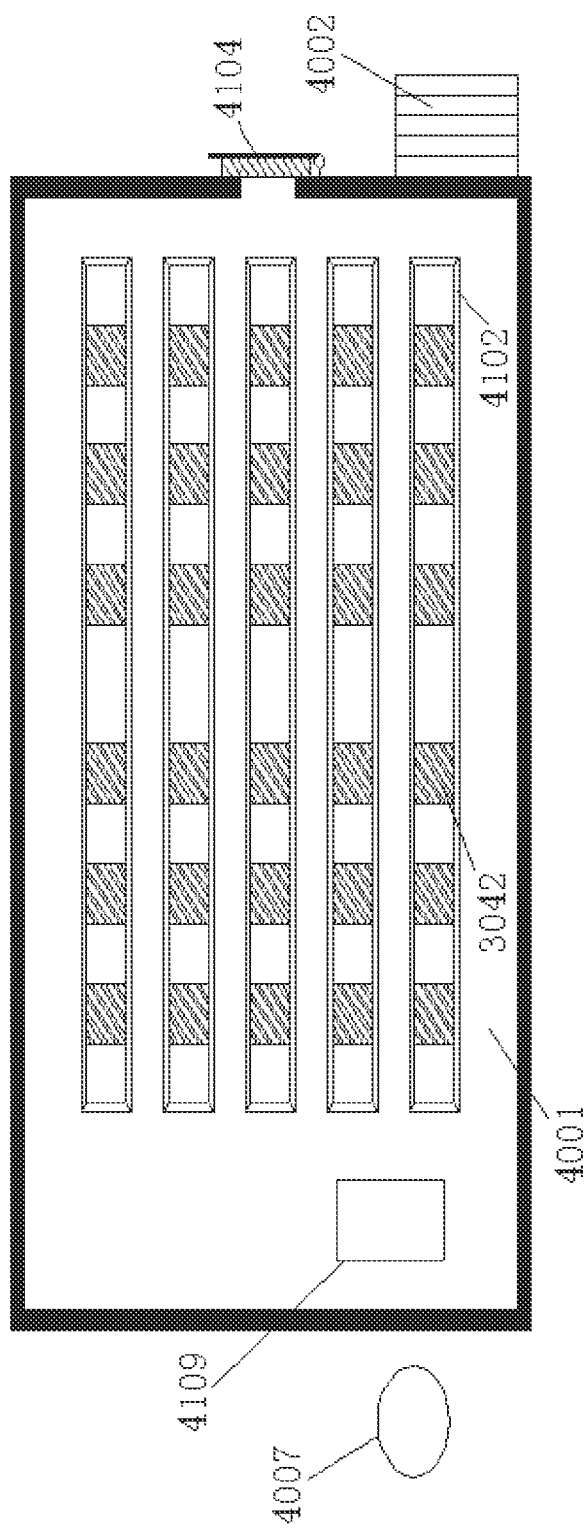
FIG. 9 is the top view of the storage device shown in FIG. 8.

Refer to FIGS. 8 and 9, in one embodiment, the accumulator battery system 2100 of present application is fixed inside a storage device which is waterproof, shockproof and temperature adjustable to ensure its reliability. The storage device includes a shockproof accommodating cavity which can be cast by reinforced concrete or made of metal material or the combination of the shockproof, press-proof, waterproof material. The structure intensity of the cavity should meet the requirement of maintaining integrity under the conditions of flooding or impact of other objects. The cavity is provided with flame resist material at the inner surface which is used to prevent the cavity from being damaged by the fire. The accommodating cavity has the cavity accommodating the battery cabin 3042, converter 2111 and monitoring devices 4301 used by the online monitoring system 3040, wherein the cavity accommodating the battery cabin 3042 is sealed around to withstand flooding and impact of other objects. The storage location of the converter 2111 and monitoring devices 4301 is higher than the storage location of the battery cabin 3042. For example, the accommodating cavity is divided into two layers, wherein the first layer cavity 4001 located on the lower layer is used to accommodate plurality of battery cabins 3042, while the second layer located on the upper layer is further divided into two cavities 4003, 4004, wherein the cavity 4004 is used to accommodate the converter 2111 electrically connected to the battery cabin 3042 and distribution devices 4402. The converter 2111 has the following functionalities: (1) AC-DC conversion function; (2) function to increase or decrease the electrical energy; (3) distribution for the accumulation system itself; (4) receiving high voltage of external grid during normal operation and converting to AC of voltage level required by the converter station; (5) In case that the external grid needs power supply, converting AC output from converter 2111 to high voltage. For anti-earthquake purpose, the converter 2111 is provided with impact-resist components as internal components, spring or plastic gasket are added to the fixation bolts of the plates and components to avoid being loosened under earthquake or vibration conditions. In order to ensure the anti-earthquake performance of the devices, the battery cabin 3042, converter 2111 and monitoring devices 4301 are provided with plurality of flexible electrical connection interface. The other cavity of the second layer is a control chamber to accommodate the monitoring device 4301 which is used to monitor the state of the entire accumulator system and operate and adjust the input and output of the accumulator power. Moreover, maintenance room could be equipped to accommodate tools and backup battery modules. The accommodating cavity could be provided with ladder 4002 outside which is used to facilitate the personnel to access the second layer.

Figure 10:
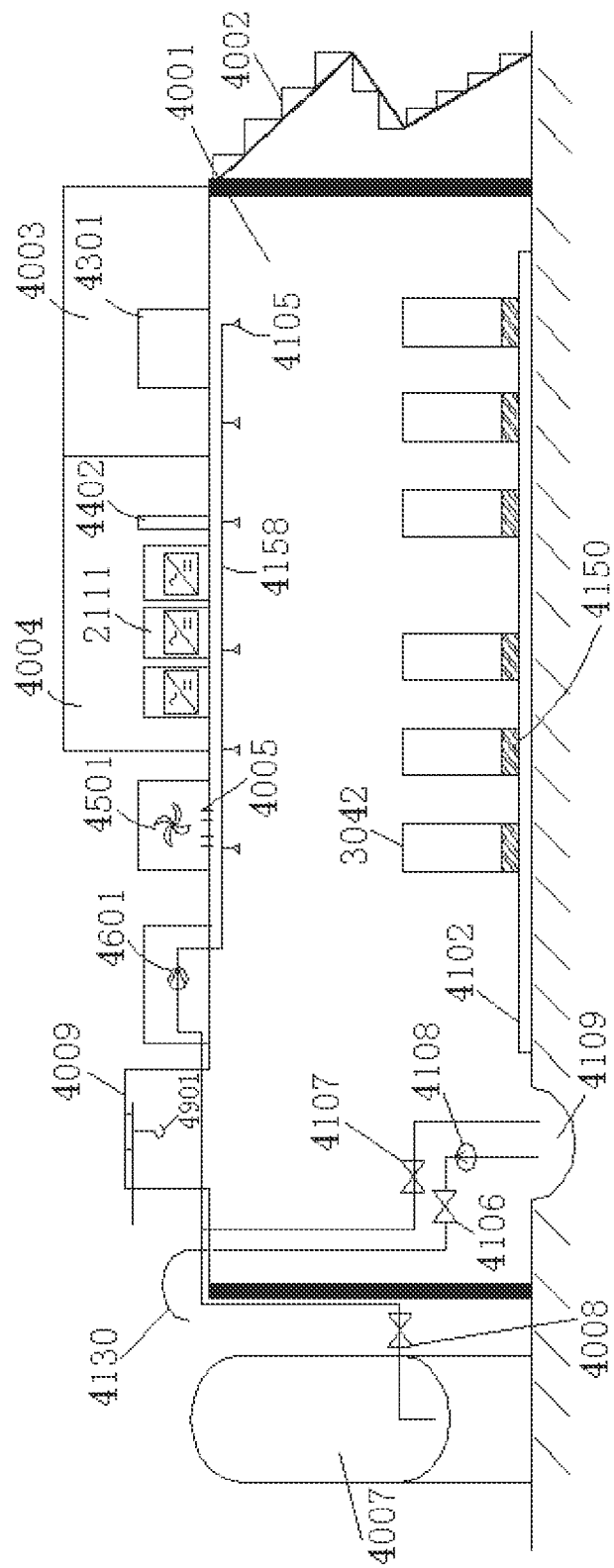
FIG. 10 illustrates the schematic diagram of the storage device according to another embodiment of the present invention.

The first layer cavity 4001 used to accommodate the battery cabin 3042 is provided with access opening at the sidewall to facilitate the transportation of devices and operator access. The access opening is sealed with waterproof gate 4104 to make the first layer cavity to form an enclosed cavity, preventing the battery cabin 3042 and other electrical components from being damaged by the flooding and mudslides caused by disaster. In other embodiments, as shown in FIG. 10, the access opening could be located on the top of the first layer cavity 4001, the height of which should ensure that the flooding, tsunami or mudslides could not enter under the disaster condition. On the top of the access opening, there is a device transportation compartment 4009, on the top of which a lifting mechanism 4901 is equipped to lift the battery cabin 3042 into or out of the first layer cavity 4001. The first layer cavity could be provided with ladder 4001 inside which is used to facilitate the operator or maintenance personnel to access the access opening.

The first layer cavity is provided with base 4102 at the bottom which is higher than the bottom surface to fix the battery cabin 3042, e.g. the cement platform 3026 as shown in FIG. 7, preventing the battery cabin from being damaged by water and impurity at the bottom. Elastic pad could be added to the joint face of the base 4102 and the battery cabin 3042 to fix the battery cabin on the base 4102 tightly, which is also used to avoid the mutual impact of the base 4102 and the battery cabin 3042, resulting in ensuring the safety and reliability of the entire accumulator system. In one embodiment, the base 4102 could use high strength, corrosion resistance, strong anti-earthquake performance materials, which also needs to be in good attaching with the bottom surface of the first layer cavity. Moreover, the base could comprise of plurality of lugs combination, each of the lugs could be frustum-like structure, such as truncated cone, Polygonal frustum or trapezoidal cone, forming a drainage slope, the upper surface of the lug is non-slip surface to facilitate the fixation of the battery cabin. In another embodiment, the base could comprise of base stand having plurality of hollow areas, the bottom of the battery cabin is fixed to the solid part of the base stand. In case that there are water infiltrating into the first layer cavity due to the flooding, tsunami, or mudslides, the hollow area facilitates the overflow of the water, thus improving the reliability of the battery cabin.

A water pit is disposed on the ground of the first layer cavity 4001. In order to avoid too much water spreading to the ground, drainage devices 4108 are equipped, which are used to extract the water into the pipe 4130 extending outside the accommodating cavity to drain via the control valve 4106. To ensure the safety of the battery cabin under fire condition, a plurality of nozzles which could inject water in fire are disposed on top of the location where the battery cabin 3042 are mounted, each nozzle 4105 could be disposed on a water pipe fixed on the top of the first layer cavity 4001. The water pipe has two branches, one of those is connected to the water tank 4007 located outside the accommodating cavity with a pump 4601 and control valve 4008 equipped, the other branch extends to the water pit 4109, whose inlet is placed into the water pit 4109, with a control valve 4107 equipped. Through the water pipe 4158, the water in water tank 4007 could be introduced to the nozzles to extinguish the fire. In case that the water in water tank 4007 is not enough, the water in water pit 4109 could be introduced to the nozzles to extinguish the fire via control valve 4107. At that time, the water pit 4109 could also be used to collect the water from the nozzles which can be backup fire water. Filter devices could be equipped in the water pit 4109, the spray water and stagnant water could be filtered through coarse filter and enter the water pit 4109, then be filtered through fine filter and enter the inlet of the pump 4108, which ensures the reliability of the pumping equipment.

The first layer cavity should be ventilated and heat dissipated to ensure the normal operation of the battery cabin 3042 wherein and increase its service life. The ventilation is mainly used to exhaust the indoor gas, and adjust the room temperature as well, maintaining the temperature of the first layer cavity to be between 10° C. and 30° C. The first layer cavity is provided with a waterproof vent 4005 at the top, which is connected to ventilation device 4501 located outside of the accommodating cavity. Ventilation exhaust pipe should be introduced outside the accommodating cavity to the location higher than the top. The air inlet should be equipped with air filtration device to ensure the battery cabin to be in normal working state. In order to ensure the normal operation of the electrical devices located inside the two cavities 4003, 4004 of the second layer, air conditioner could be equipped outside the accommodating cavity used to do heat dissipation for the two cavities 4003, 4004 of the second layer.

Figure 11:
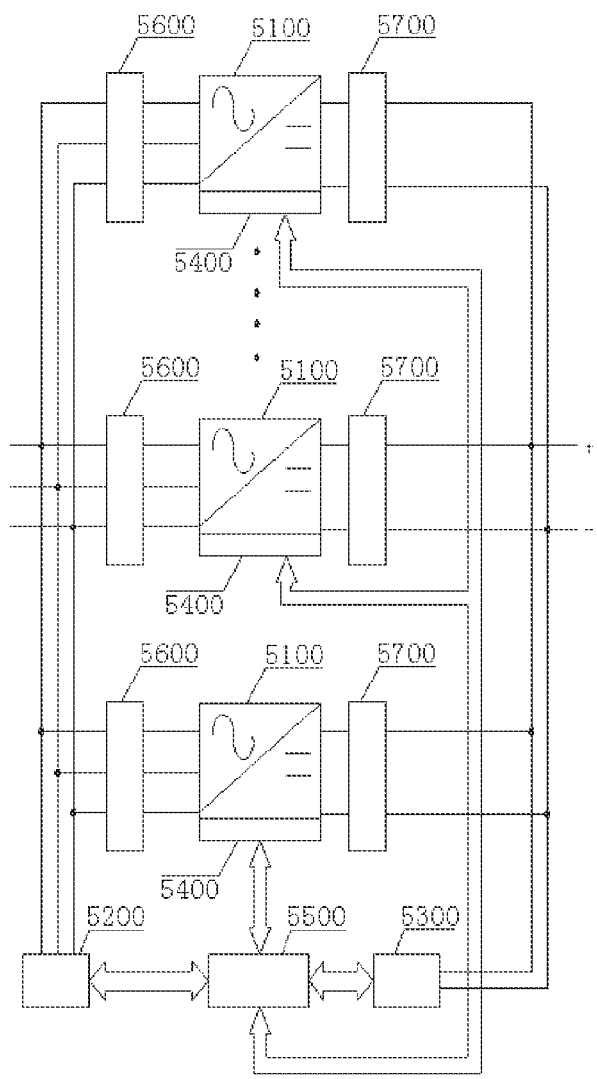
FIG. 11 illustrates the schematic diagram of the converter according to one embodiment of the present invention.

Refer to FIG. 11, in one embodiment, the converter includes plurality of converter units, plurality of internal controllers 5400, plurality of DC filter unit 5700, AC sampling unit 5200, DC sampling unit 5300 and central controller 5500. Wherein each converter is bidirectional converter 5100, the AC side of each bidirectional converter 5100 is connected to bus rod via a AC filter unit 5600, the DC side is connected to DC bus via a DC filter unit 5700. The AC sampling unit 5200 is connected to the AC side of each bidirectional converter 5100 respectively, while the DC sampling unit 5300 is connected to the DC side of each bidirectional converter 5100 respectively. Each bidirectional converter 5100 is connected to an internal controller 5400, a plurality of internal controllers 5400 are used to control the complete synchronization of the turn-on and turn-off of the IGBT switches of a plurality of bidirectional converters 5100 respectively, which makes flow equalization and voltage stabilization of the plurality of bidirectional converter 5100 to work synchronously. The central controller 5500 is connected to AC sampling unit 5200, DC sampling unit 5300 and the plurality of internal controllers 5400 respectively, used to control the operation of the plurality of internal controllers 5400 according to electrical signals collected in AC sampling unit 5200, such as AC voltage, AC current and phase angle, and electrical signals collected in DC sampling unit 5300, such as DC voltage and DC current. The central controller uses DSP or programmable advanced controller. In one embodiment, the central controller is connected to the plurality of internal controllers via CAN-BUS in two-wire serial communication.

Figure 12:
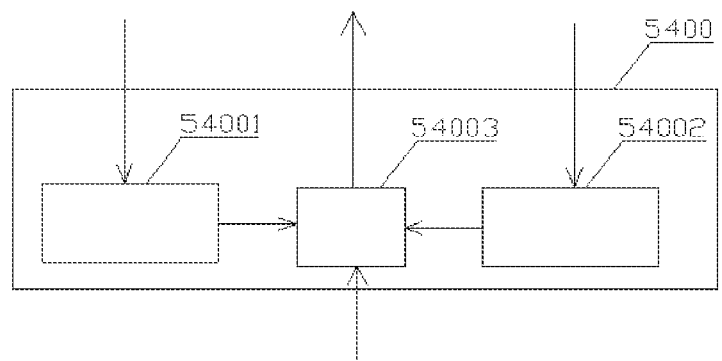
FIG. 12 illustrates the schematic diagram of the internal controller of the converter according to one embodiment of the present invention.

Refer to FIG. 12, in one embodiment, the internal controller 5400 includes: AC sampling module 54001 connected to the AC side of a bidirectional converter, DC sampling module 54002 connected to the AC side of the bidirectional converter, control module 54003 connected to the AC sampling module 54001, the DC sampling module 54002, the central controller 5500 and the bidirectional converter respectively, which is used to make the electrical signals output from the bidirectional converter to be same as predefined value according to the electrical signals collected in the AC sampling module 54001 and the DC sampling module 54002 and the control signals of the central controller 5500.

In other embodiments, the plurality of converter units in the converter device could be a plurality of rectifiers, in that case, comparing with the converter device as shown in FIG. 11, there is no AC sampling unit, the central controller controls the plurality of internal controllers according to the electrical signals collected in the DC sampling unit. The corresponding internal controllers are not provided with AC sampling unit any more, the control module of internal controller makes the electrical signals output from the connected rectifier to be same as predefined value according to the electrical signals collected in the DC sampling module and the control signals of the central controller.

In other embodiments, the plurality of converter units in the converter device could be a plurality of inverters, in that case, comparing with the converter device as shown in FIG. 11, there is no DC sampling unit, the central controller controls the plurality of internal controllers according to the electrical signals collected in the AC sampling unit. The corresponding internal controllers are not provided with DC sampling unit any more, the control module of internal controller makes the electrical signals output from the connected inverter to be same as predefined value according to the electrical signals collected in the AC sampling module and the control signals of the central controller.

In one embodiment, the control method for synchronous working of the converter device are as followed: the plurality of internal controllers collect the electrical signals output from the plurality of converter units respectively; the central controller calculated the average value of the electrical signals; sampling unit collects the real time parallel average value of the electrical signals output by the plurality of the converter units; the central controller calculates the average difference value of the electrical signals according to the calculated average value of the electrical signals and the real time parallel average value of the electrical signals, then decomposes the average difference value to get compensation value; the plurality of internal controller could get the compensation value and control the electrical signals output by the corresponding converter unit to synchronize the electrical signals output by the plurality of converter units.

In one embodiment, the working modes of the converter device are two as followed: one mode is to convert AC to DC, the other one is to convert DC to AC. The mode selection is controlled by the mode selector, which determines the working mode of the bidirectional converter via automatic detection, or receiving the signals of online monitoring system, or manual signals.

It should be understood that the above embodiments is used to assist in the understanding of the present application, which should not be understood as any limitations. For the skilled in the art, modifications could be done to the above embodiments based on the spirit of the present application.

The invention claimed is:

1. Method to provide emergency power supply to nuclear power plant, comprising:
providing accumulator battery system, said accumulator battery system is connected to emergency bus and monitored by online monitoring system, wherein the online monitoring system is configured to:
collect performance parameters of batteries in the accumulator battery system, and calculate the total capacity of the accumulator battery system, wherein the accumulator battery system comprises a plurality of accumulator system modules in parallel connection, said plurality of accumulator system modules are connected to the emergency bus via bus rod, the accumulator system module comprises converter device and battery array, said battery array is connected to the bus rod via the converter device, a first switch control unit is disposed between the accumulator system module and the bus rod, the online monitoring system control the accumulator system module to put into operation via controlling the first switch control unit according to the load capacity under current working conditions,
monitor working conditions of the nuclear power plant, calculate load capacity of the nuclear power plant under current working conditions, in case of power loss of the electrical devices of the nuclear power plant, start the accumulator battery system to provide power supply to the electrical devices of the nuclear power plant via the emergency bus according to the total capacity of the accumulator battery system and the load capacity of the nuclear power plant under current working conditions;
in case of power loss of electrical devices of the nuclear power plant, the online monitoring system starts the accumulator battery system to provide power supply to the electrical devices of the nuclear power plant via the emergency bus.

2. The method of claim 1, wherein the battery array comprises a plurality of battery modules, said plurality of battery modules are in parallel connection with the converter device, the battery module comprises a plurality single batteries in serial and/or parallel connection, a second switch control unit is dispose between the battery modules and the converter device, the online monitoring system determines whether the battery modules are faulty or not according to the performance parameters of the batteries in the accumulator battery system, the online monitoring system isolates faulty battery modules and puts backup battery modules into operation.

3. The method of claim 1, wherein during battery testing or maintaining, an accumulator system module is controlled to charge another accumulator system module.

4. The method of claim 1, wherein the online monitoring system is configured to
put a first accumulator system module in the accumulator battery system into operation;
put a second accumulator system module in the accumulator battery system into operation, and perform in loop until all accumulator system modules are put into operation or the accumulator battery system meets corresponding power supply requirements.

5. The method of claim 1, wherein the online monitoring system is configured to: send isolated island starting command to the accumulator battery system to enter isolated island mode, control the accumulator battery system to provide power supply to the loss of power devices of the nuclear power plant, wherein steps of controlling the accumulator battery system to provide power supply to the loss of power devices comprise: controlling the accumulator battery system to drive Hydrotest Pump Turbine Generator Set and control system of the accumulator battery system itself to work normally; controlling the accumulator battery system to drive auxiliary water supply system to work normally; When external power grid is retrieved and voltage of grid side of parallel breaker is inspected to be normal and last for a predetermined time, disconnecting the outlet breaker of the accumulator battery system and entering non-isolated island operation mode.

6. The method of claim 1, wherein further providing portable accumulator battery system, switching on at least one portable accumulator battery system in case that the total capacity of the accumulator battery system is not enough for the load capacity under current working conditions.

7. System to provide emergency power supply to nuclear power plant, used to provide emergency power supply to electrical devices of nuclear power plant, comprising:

accumulator battery system, online monitoring system electrically connected to the accumulator battery system, the accumulator battery system is connected to the electrical devices of the nuclear power plant via emergency bus, wherein the accumulator battery system comprises a plurality of accumulator system modules, the plurality of accumulator system modules are connected to the emergency bus in parallel connection via bus rod, the accumulator system module comprises converter device and battery array, the converter device is connected to the bus rod, the battery array is connected to the converter device, the battery array comprises DC bus and battery modules, the battery modules are in parallel connection with the DC bus, the DC bus is connected to the converter device; the battery module comprises a plurality of single batteries in serial and/or parallel connection, a second switch control unit is disposed between the battery module and converter device, controlled by the online monitoring system; a first switch control unit is disposed between the accumulator system module and the bus rod, controlled by the online monitoring system;

the online monitoring system is configured to collect performance parameters of batteries in the accumulator battery system, calculate total capacity of the accumulator battery system, monitor working conditions of the nuclear power plant, calculate load capacity of the nuclear power plant under current working conditions, in case of power loss of the electrical devices of the nuclear power plant, start the accumulator battery system to provide power supply to the electrical devices of the nuclear power plant via the emergency bus according to the total capacity of the accumulator battery system and the load capacity of the nuclear power plant under current working conditions.

8. The system of claim 7, wherein the accumulator system module further comprises battery module monitor to monitor state of each battery module in real time, the battery module includes a plurality of battery packs in serial and/or parallel connection, the battery pack includes a plurality of single batteries in serial connection; each single battery is arranged in rows or columns, flexible pad or at least two vertical flexible strips are disposed between each single battery, positive pole and negative pole of each two adjacent batteries are in flexible electrical connection, the single battery is provided with temperature collection components and voltage collection components inside, the temperature collection components and voltage collection components are configured to send the collected temperature and voltage of the single battery to signal aggregation module of the battery pack, the signal aggregation module is connected to the battery module monitor via data transmission line.

9. The system of claim 8, wherein the plurality of battery packs are fixed to battery cabin or inside battery rack, the battery cabin or battery rack is provided with a plurality parallel bulkheads to form a plurality of battery compartments accommodating the plurality of battery packs, the signal aggregation module is disposed in the battery compartment, wiring compartment is disposed vertically at the side end of the battery cabin or battery rack, the battery module monitor is disposed on the cabin body or rack body, the battery pack is disposed inside a shell, then mounted in the battery compartment; the shell is provided with elastic piece in flexible contact with the outside of the battery pack on inner wall, the shell is also provided with an end cap used to compress and fix the single batteries inside the shell tightly.

10. The system of claim 8, wherein the plurality of battery packs are fixed inside a battery cabin or battery rack, the battery cabin or rack is provide with a plurality of parallel bulkheads to form battery compartment accommodating the plurality of battery packs, the signal aggregation module is disposed in the battery compartment, wiring compartment is disposed vertically at the side end of the battery cabin or battery rack, the battery module monitor is disposed on the cabin body or rack body, the battery pack with the single batteries being arranged is disposed on battery basket with an opening at one end, then mounted on the battery compartment; the battery basket is provided with elastic piece in flexible contact with the outside of the battery pack, the battery basket is provided with second connection piece used to connect the fastening strips for fastening the single batteries arranged in the battery basket.

11. The system of claim 9, wherein the system to provide emergency power supply to nuclear power plant is disposed in a storage device, said storage device is waterproof, shockproof and temperature adjustable, the storage device is disposed on a reference platform, comprising an shockproof accommodating cavity fixed to the reference platform, cavity to accommodate the battery cabin or battery rack, converter device and monitoring and control devices are disposed in the accommodating cavity, the storage location of the converter device and monitoring and control devices are higher than the storage location of the battery cabin or battery rack, the cavity to accommodate the battery cabin or battery rack has a plurality of bases used to mount and fix the battery cabin or battery rack, each of the bases is higher than the cavity ground.

12. system of claim 11, wherein the cavity to accommodate the battery cabin or battery rack is provided with water pit at the bottom, drainage equipment used to drain the accommodating cavity is disposed in the water pit, nozzles used to spray water in case of fire are disposed on the top of the cavity accommodating the battery cabin or battery rack, each of the nozzles is disposed on a water pipe connected to the water pit, the water pipe is also connected to a water tank dispose outside the accommodating cavity, the water pipe is provide with water pump and control valve.

13. The system of claim 10, wherein the system to provide emergency power supply to nuclear power plant is disposed in a storage device, said storage device is waterproof, shockproof and temperature adjustable, the storage device is disposed on a reference platform, comprising an shockproof accommodating cavity fixed to the reference platform, cavity to accommodate the battery cabin or battery rack, converter device and monitoring and control devices are disposed in the accommodating cavity, the storage location of the converter device and monitoring and control devices are higher than the storage location of the battery cabin or battery rack, the cavity to accommodate the battery cabin or battery rack has a plurality of bases used to mount and fix the battery cabin or battery rack, each of the bases is higher than the cavity ground.

* * * * *